United States Patent Office 3,437,608
Patented Apr. 8, 1969

3,437,608
GEL-RISE RETARDATION IN POLY-
URETHANE FOAMS
Raymond A. Pohl, Syracuse, N.Y., assignor to Allied
Chemical Corporation, New York, N.Y., a corporation
of New York
No Drawing. Filed June 1, 1965, Ser. No. 460,578
Int. Cl. C08g 22/44, 22/46
U.S. Cl. 260—2.5                                    6 Claims

ABSTRACT OF THE DISCLOSURE

Invention relates to an improved process for the preparation of moldable polyurethane foams by reacting a crude organic polyisocyanate composition with a polyol and a blowing agent, said crude organic polyisocyanate consisting essentially of the reaction product of a crude organic polyisocyanate and a secondary or tertiary amine having a molecular weight of less than 300 and having at least one active hydrogen per molecule.

---

Polyurethane foams prepared from crude polyisocyanates have the advantages of high cross link density leading to improved flame retardancy, good dimensional stability, and low friability. There are, however, processing difficulties, i.e., a basic incompatibility between the crude polyisocyanates and the various conventional polyols and also a reluctance of the foam to mold. Molding procedures require the partially-reacted foaming mass to remain tractable for sufficient time to fill the voids of the mold.

The incompatibility of these urethane systems necessitated special mixing procedures and machine alterations to prevent non-uniform foam and required use of fairly large quantities of catalyst and emulsifier to achieve a rapid creaming of ingredients. High levels of catalyst, however, also led to rapid gelation since the crude polyisocyanates give greater cross-linking per degree of reaction than refined tolylene diisocyanate and the time period during which molding of the foam could be accomplished was correspondingly decreased.

The course of the foaming reaction is followed by observation of three time periods: (1) cream time, (2) gel time, and (3) rise time. The cream time is the first indication of reaction and is noted as the time from mixing to start of gas evolution caused by vaporization of blowing agent and is generally accompanied by a slight color change. The gel time, defined for purpose of following foaming reactions, is the point at which sufficient cross-linking of reactants has occurred to cause formation of soft threads when an object is touched to the surface of the foaming mass and withdrawn. It is noted as the total time elapsed from start of mixing to initial observation of this phenomenon. With crude polyisocyanates, the duration of time during which this occurrence could be observed was short. The rise time is recorded as the time elapsed between time of mixing and the time at which the foam has blown to its maximum height.

With crude polyisocyanates the foaming mass rapidly becomes intractable at the gel point and although still expanding tends to resist molding. At any given cream time, the opportunity to fill the voids of the mold increases as gel and rise times are lengthened, i.e., at cream times of up to 20 seconds, gel times of at least 55 seconds, and rise times of at least 85 seconds are desirable for the moldable polyurethane foam.

An object of this invention is to provide crude polyisocyanate compositions adapted for use in preparing moldable polyurethanes.

A further object is to provide polyisocyanate compositions which will, under conventional foaming procedures, give the foam desirably extended gel and rise times while maintaining materially unaffected cream times.

Still a further object is to provide processes for preparing polyurethane foams using the novel polyisocyanate compositions.

Other objects and advantages will become apparent hereinafter.

I have fortuitously discovered a crude polyisocyanate composition which is uniquely adapted for use in the production of moldable polyurethanes. This crude polyisocyanate composition is composed of a crude organic polyisocyanate having incorporated therein about 0.3% to about 3.0% by weight of a gel-rise retardant agent consisting essentially of an organic amine selected from the group consisting of secondary and tertiary amines, said amine having a molecular weight of less than 300 and having at least one active hydrogen per molecule.

The weight percent of the organic amine is based on the weight of the polyisocyanate and a Zerewitinoff determination, as discussed in Feiser et al., Advanced Organic Chemistry, Reinhold Publ. Corp., New York, 1961, p. 421, can be used to determine the number of active hydrogens per molecule of amine. The well-known Zerwitinoff procedure wherein substances containing hydrogen are reacted with methyl magnesium halides to liberate methane is also discussed by Houben-Weyl: Methoden Der Organischen Chemie 4 Auf. Band 2, p. 318.

Although the temperature is not critical, I have found that to achieve the highest degree of moldability it is preferable to use temperatures of about 25° C. or less, both for preparing the novel isocyanate composition and the urethane foam. Temperatures of about 18° to 21° C. have been found to be optimum.

The crude polyisocyanate can be prepared by conventional methods, the term "crude" being defined as undistilled or as typifying a polyisocyanate product wherein the residue has not been removed from the reaction mixture although a part or all of the solvent may be.

Examples of crude organic polyisocyanates are crude polymethylene polyphenylisocyanate (PAPI) prepared by the process set forth in U.S. Patent No. 2,683,730 or Canadian Patent No. 665,495; a crude mixture of the 2,4 and 2,6 isomers of tolylene diisocyanate (TDI) prepared by a process set forth in French Patent No. 1,375,-975; and crude 4,4'-diphenylmethane diisocyanate (MDI) prepared by the process suggested in Saunders et al., Polyurethanes, Chemistry and Technology, Part II: Technology, High Polymers, vol. XVI, Interscience Publishers, 1964, pp. 197 and 198. Crude TDI is also discussed here.

A general discussion of rigid foams and the role of isocyanates therein takes place at pp. 193 to 298 of the same Saunders et al. publication. It should be noted that my novel crude organic polyisocyanate is peculiarly adapted for use in the conventional one-shot system. A general discussion of the raw materials used in the preparation of the polyurethanes including isocyanates, polyethers, and polyesters and the formation of urethane foams can be found in Saunders et al., Polyurethanes, Chemistry and Technology, Part I: Chemistry, High Polymers, vol. XVI, Interscience Publishers, 1962, pp. 17 to 61 and 219 to 260. Conventional catalysts such as the tertiary amines, other adjuvants such as silicone oils or emulsifiers, stabilizers, cell size control agents, and blowing agents such as water and the fluorocarbons can be used and are discussed in both of the Saunders et al. publications.

The gel-rise retardant agent, which, in combination with the crude polyisocyanate, achieves the surprising results, i.e., a moldable polyurethane foam, obtained by this invention, consists essentially of an organic amine or mixtures of organic amines selected from the group consisting of secondary and tertiary amines. The organic amine has a molecular weight of less than 300 and preferably from about 40 to about 200. It has been found that at least one active hydrogen per molecule is necessary for the organic amine which is used in the gel-rise retardation agent, thus triethylamine has been observed to be ineffectual in this capacity. The amount of gel-rise retardant agent which can be used is from about 0.3% to about 3.0% by weight based on the weight of the crude polyisocyanate. The preferred range is from about 0.5% to about 2.5%. Examples of organic amines which can be used are di-methylaminoethanol, diethylamine, diethanolamine, dimethylamine, di-n-propylamine, triethanolamine, di-n-butylamine, dibutanolamine, dipropanolamine, tributanolamine, tripropanolamine, di-n-amylamine, morpholine, and methyldiethanolamine. Up to 20 carbon atoms per molecule of organic amine and straight and branched chain alkyl, alkaryl, and aryl amines along with various substituents such as hydroxy, halo-, and nitro groups are contemplated.

In addition to the organic amine gel-rise retardant agent referred to above, a variety of adjuvants with one or more active hydrogens can be incorporated into the composition. Examples are water, polypropylene glycols including dipropylene glycol, organic alcohols such as methyl and ethyl alcohol, polyols in addition to the glycols such as glycerol and sorbitol, primary amines including methylene dianiline, and other organic compounds having an active hydrogen. These active hydrogen adjuvants can be used in quantities of about 0.1% to about 5.0% by weight of the crude polyisocyanate and are preferably used in the range of about 0.15% to about 4.0%. Diols of up to 2000 molecular weight, triols to octols of 90 to 2000 molecular weight and combinations thereof are contemplated. Polyalkylene polyols and especially polypropylene glycols are preferred. The alkylene portion can range from 1 to 10 carbon atoms, the number of alkylene units can range from 1 to 8, and the polyol can include diols through octols.

A conventional one-shot process can be used for the preparation of the foam, i.e., the crude polyisocyanate composition having the gel-rise retardant agent incorporated therein is admixed with a polyether or polyester polyol and a blowing agent to form the polyurethane foam. The one-shot process is discussed in the publications cited above. In addition to the polyols, blowing agents, and catalysts referred to, the gel-rise retardant agents and adjuvants mentioned for use in the novel polyisocyanate can be used in the foaming process for catalytic and other effects for which they are generally known. It must be stressed, however, that the gel-rise retardation effect can only be obtained by incorporation of the gel-rise retardant agent into the crude polyisocyanate before the one-shot process. This is illustrated by the examples wherein the gel-rise retardant agent was introduced during the one-shot process and the resultant foams were not moldable.

The following examples, in which parts and percentages are by weight, illustrate my invention. In these examples the novel isocyanate was prepared as Formulation A by mixing the crude polyisocyanate with the gel-rise retardant agent at a specified temperature. Where no gel-rise retardant agent is mentioned for Formulation A, a control is intended. Formulation A was then mixed with Formulation B at a specified temperature to prepare the foam. The crude polyisocyanate used in Examples I–VII was polymethylene polyphenylisocyanate (PAPI) having an average functionality of 3 and an equivalent weight of 134. The PAPI was prepared by the process set forth in United States Patent No. 2,683,730.

The premix used in Formulation B was a mixture of a polyether polyol and 23.8% trichloromonofluoromethane. The polyether polyol was prepared by the process set forth in the copending United States application of Robert A. Wiles entitled "Fire Retardant Urethanes and Organic Antimony Compounds Thereof," filed Dec. 23, 1963, Ser. No. 332,880, now U.S. Patent No. 3,359,218 (see Example I of that application in particular). The premix had an equivalent weight of 180.

The polypropylene glycol used in Example IV had an equivalent weight of 148 and was prepared by a conventional method.

The gel time was recorded as the time elapsed from the start of mixing Formulations A and B to the point at which soft threads are formed when an ordinary wooden tongue depressor is touched to the surface of the foaming mass and withdrawn.

The rise time was recorded as the time elapsed from the start of mixing Formulations A and B to the point at which the foam had blown to its maximum height.

Moldability was measured by placing a weighted cover over the mold container after pouring the mixture of Formulations A and B into the mold. The foam was considered moldable if the rising mass spread horizontally to fill the voids of the container upon reaching the cover. If the foam displaced the weighted cover without spreading to fill the container, the foam was classified nonmoldable.

The examples were all carried out in the same manner. Ingredients, amounts, temperatures, gel time, and rise time are listed in the table below.

TABLE

[Values in Formulations Represent Parts]

| | Formulation A | | | Reaction Temperature for Formulation A (° C.) |
|---|---|---|---|---|
| | PAPI | Gel-Rise Retardant Agent(s) | Adjuvant(s) | |
| Example No.: | | | | |
| I | 118.3 | 0 | 0 | [3] 20 |
| II | 118.3 | Dimethylaminoethanol, 2.8 | 0 | 18 |
| III | 118.3 | Dimethylaminoethanol, 1.12 | H₂O, 0.17 | 16 |
| IV | 118.9 | Dimethylaminoethanol, 1.32 | Polypropylene glycol, 3.1 | 18 |
| V | 119.4 | Diethylamine, 1.1 | 0 | 18 |
| VI | 118.4 | Dimethylaminoethanol, 1.2 | Dipropylene glycol, 1.4 | 19 |
| VII | 114 | Dimethylaminoethanol, 1.12 | 0 | 20 |
| VIII | 116 | Diethanolamine, 0.496; dimethylaminoethanol, 0.84 | 0 | 21 |
| IX | [1] 88.4 | Dimethylaminoethanol, 1.8 | Dipropylene glycol, 1.4 | 20 |
| X | [2] 120.5 | 0 | 0 | [4] 20 |
| XI | [2] 120.5 | Dimethylaminoethanol, 1.8 | Dipropylene glycol, 1.4 | 20 |

TABLE—Continued

| Example No. | Premix | Formulation B Adjuvant(s) | Silicone Emulsifier | Reaction Temperature for Formulation B (°C.) |
|---|---|---|---|---|
| I | 150 | Dimethylamino-ethanol, 2.8 | 1.5 | 20 |
| II | 150 | 0 | 1.5 | 20 |
| III | 150 | 0 | 1.5 | 20 |
| IV | 150 | 0 | 1.5 | 18 |
| V | 150 | Dimethylamino-ethanol, 1.4 | 1.5 | 18 |
| VI | 150 | 0 | 1.5 | 19 |
| VII | 150 | 0 | 1.5 | 20 |
| VIII | 150 | 0 | 1.5 | 21 |
| IX | 150 | 0 | 1.5 | 20 |
| X | 150 | Dimethylamino-ethanol, 1.8; dipropylene glycol, 1.4 | 1.5 | 20 |
| XI | 150 | 0 | 1.5 | 20 |

| Example No.: | Results Gel Time (Seconds) | Rise Time (Seconds) | Moldability |
|---|---|---|---|
| I | 50 | 70 | No. |
| II | 57 | 85 | Yes. |
| III | 90 | 120 | Yes. |
| IV | 65 | 100 | Yes. |
| V | 80 | 100 | Yes. |
| VI | 105 | 120 | Yes. |
| VII | 75 | 100 | Yes. |
| VIII | 105 | 130 | Yes. |
| IX | 105 | 150 | Yes. |
| X | 75 | 75 | No. |
| XI | 160 | 180 | Yes. |

[1] PAPI was replaced by an undistilled (crude) grade of a mixture of the 2,4 and 2,6 isomers of tolylene diisocyanate. This isocyanate was prepared by a process set forth in French Patent No. 1,375,975.
[2] PAPI was replaced by an undistilled (crude) grade of 4,4'-diphenylmethane diisocyanate.
[3] Temperature of PAPI.
[4] Temperature of PAPI substitute.

In Examples I to XI, inclusive, the cream times were clocked at 20 seconds or less, the cream time being materially unaffected in the subject process.

I claim:

1. In a process for preparing a moldable polyurethane foam which comprises admixing a crude organic polyisocyanate composition with a polyol selected from the group consisting of polyether and polyester polyols and a blowing agent, the improvement wherein said crude organic polyisocyanate composition is prepared by admixing a crude organic polyisocyanate with about 0.3% to about 3.0% by weight of a gel-rise retardant agent consisting essentially of an organic amine selected from the group consisting of secondary and tertiary amines; said amine having a molecular weight of less than 300 and having at least one active hydrogen per molecule; said crude organic polyisocyanate comprising the undistilled residue of the reaction product of phosgene and an aromatic polyamine.

2. The process as defiend in claim 1 wherein the gel-rise retardant agent is used in an amount about 0.5% to about 2.5% by weight and has a molecular weight of about 40 to 200.

3. The process of claim 1 wherein the gel-rise retardation agent is selected from the group consisting of dimethylaminoethanol, diethylamine, diethanolamine, dimethylamine, di-n-propylamine, triethanolamine, di-n-butylamine, dibutanolamine, dipropanolamine, tributanolamine, tripopanolamine, di-n-amylamine, morpholine, and methyldiethanolamine.

4. The process of claim 1 wherein the gel-rise retardation agent is dimethylaminoethanol.

5. The process of claim 1 wherein about 0.1 to about 5% by weight of an adjuvant selected from the group consisting of polypropylene glycol and water is admixed with the crude organic polyisocyanate and gel-rise retardation agent.

6. The process of claim 1 wherein the polyurethane foam is prepared by a one-shot process wherein the crude polyisocyanate composition, polyol and blowing agent are mixed together and foamed.

References Cited

UNITED STATES PATENTS

| 2,968,672 | 1/1961 | Ephraim | 260—472 |
| 2,995,530 | 8/1961 | Frisch et al. | 260—2.5 |
| 3,136,731 | 6/1964 | Piechota et al. | 260—2.5 |
| 3,194,770 | 7/1965 | Hostettler | 252—431 |
| 3,235,518 | 2/1966 | Hostettler et al. | 260—2.5 |

DONALD E. CZAJA, *Primary Examiner.*

M. J. WELSH, *Assistant Examiner.*